(12) United States Patent
Bala et al.

(10) Patent No.: US 8,487,955 B2
(45) Date of Patent: Jul. 16, 2013

(54) LANGUAGE-BASED COLOR EDITING FOR MOBILE DEVICES

(75) Inventors: Raja Bala, Pittsford, NY (US); Karen M. Braun, Fairport, NY (US); Yonghui Zhao, Penfield, NY (US); Zahra Langford, Rochester, NY (US); Robert J. Rolleston, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 465 days.

(21) Appl. No.: 12/826,900

(22) Filed: Jun. 30, 2010

(65) Prior Publication Data

US 2012/0001934 A1 Jan. 5, 2012

(51) Int. Cl.
| | |
|---|---|
| G09G 5/00 | (2006.01) |
| G09G 5/02 | (2006.01) |
| G06K 9/00 | (2006.01) |
| G06K 9/40 | (2006.01) |
| G06K 9/32 | (2006.01) |
| H04N 1/40 | (2006.01) |

(52) U.S. Cl.
USPC ........... 345/594; 345/156; 345/581; 345/589; 345/591; 345/619; 348/552; 358/519; 358/527; 358/531; 358/537; 382/162; 382/167; 382/254; 382/274; 382/312

(58) Field of Classification Search
USPC ......... 345/418–419, 427, 428, 581, 589–591, 345/593–594, 597, 600, 618–620, 624, 345/629–630, 633, 650, 653–654, 659, 156, 345/158–160, 173–177, 501, 520, 548–549; 348/552–553, 557, 564, 576–578; 358/1.1, 358/504, 517–519, 527, 531, 537–538, 448, 358/452–453; 382/162–167, 254, 274, 276, 382/282, 293–296, 307, 312, 309–311
See application file for complete search history.

(56) References Cited

U.S. PATENT DOCUMENTS

| | | | |
|---|---|---|---|
| 7,523,406 B2 * | 4/2009 | Cazabon et al. | 715/771 |
| 2008/0003547 A1 * | 1/2008 | Woolfe et al. | 434/98 |
| 2008/0007749 A1 * | 1/2008 | Woolfe | 358/1.9 |
| 2008/0036743 A1 * | 2/2008 | Westerman et al. | 345/173 |

(Continued)

FOREIGN PATENT DOCUMENTS

WO   WO 2010/134729 A2   11/2010

OTHER PUBLICATIONS

Indivigital, "ColorChange". Mar. 2009. http://itunes.apple.com/us/app/colorchange/id307846333?mt=8 and http://colorchangeappl.com/ [Accessed Oct. 13, 2011].

(Continued)

Primary Examiner — Wesner Sajous
(74) Attorney, Agent, or Firm — Fay Sharpe LLP (57) ABSTRACT

Methods and a system for a natural language control interface are provided to enable a user to modify colors in a digital image. A textual interface is provided to select a color to be modified within the image and a direction of change for the modification. A swipe interface is provided to select a magnitude and polarity for the modification. Actions on the textual and swipe interface are converted to natural language commands which are in turn used to derive a color transformation that is applied to relevant portions of the image to yield a modified image. The modifications are displayed in real time for a user to observe as they are inputted.

18 Claims, 7 Drawing Sheets

U.S. PATENT DOCUMENTS

2009/0232409 A1* 9/2009 Marchesotti .................. 382/254
2009/0290794 A1* 11/2009 Marchesotti .................. 382/173
2010/0085377 A1 4/2010 Woolfe
2010/0086230 A1 4/2010 Bala et al.

OTHER PUBLICATIONS

UK Intellectual Property Office, Search Report under Section 17, for Application No. GB1110758.8, date of search Oct. 13, 2011, 1 page.

* cited by examiner

LANGUAGE-BASED COLOR EDITING FOR MOBILE DEVICES

CROSS REFERENCE TO RELATED PATENTS AND APPLICATIONS

The following co-pending applications, the disclosure of which is incorporated herein by reference in its entirety is mentioned:

U.S. application Ser. No. 11/762,155 filed Jun. 13, 2007, entitled NATURAL LANGUAGE COLOR SELECTOR AND NAVIGATOR FOR SELECTING COLORS FROM A COLOR SET, by Geoffrey Woolfe, Robert R. Buckley, and John C. Handley.

BACKGROUND

The exemplary embodiment relates to fields of image processing. It finds particular application in connection with the provision of a user interface for implementing color modifications within an image or document in order to enhance its visual appearance, and is described with particular reference thereto. However, a more general application can be appreciated with regards to image classification, image content analysis, image archiving, image database management and searching, and so forth.

Digital color images are typically obtained via digital photography, digital scanning of hardcopy media, or synthetic generation by a software application. A need often arises to modify the colors in an image to improve or enhance its appearance. For example improper or inadequate color correction during the capture process may produce an image that appears excessively dark and de-saturated. Alternatively, a user may have a preference for certain colors to be reproduced in a certain manner, and this preference may not be adequately captured in the image.

Modifying the colors in a digital image via an image processing application typically requires an understanding of how the colors are numerically represented. Colors are represented as a multidimensional n-tuple (where n is typically 3 or 4). The entire valid range of n-tuples forms an n-dimensional color space. Various color spaces exist for representing colors within a digital color image. Displays use an additive color mixing model and represent color in an RGB (red green blue) color space. Printers produce color via a subtractive color mixing model, employing cyan, magenta, yellow and often black primaries. The corresponding color space for representing printed colors is referred to as CMYK. In addition, there are the so called perceptual spaces that are designed to correlate with human visual perception. CIELAB and HSV are examples of such color spaces. Depending on the workflow and application, digital color images can be represented in any of these color spaces.

Numerous software applications exist for modifying colors in images, including Adobe Photoshop, Microsoft Picture Manager, and many others. However, modifying the colors in an image using these applications requires the user to be knowledgeable about the various aforementioned color spaces and to understand how numerical changes in these color spaces induce changes in color appearance of the image. This level of knowledge and skill is typically beyond that of the average consumer who is not a color specialist.

Casual users typically employ natural language terms to describe color, such as red, green, purple, olive, maroon, etc. and would prefer to interact with color images using these terms. Every natural language that has words for colors is considered to have from two to twelve basic color terms. All other colors are usually considered by speakers of that language to be variants of these basic color terms. For example, English contains the eleven basic color terms "black," "white," "red," "green," "yellow," "blue," "brown," "orange," "pink," "purple" and "gray," which is reflected in the standard Crayola set. Italian and Russian have twelve, distinguishing blue and azure. Thus, different cultures have different terms for colors, and may also assign some color names to slightly different parts of the spectrum. For instance, the Chinese have a character for a color covering both blue and green, while blue and green traditionally are shades of that color character. South Korea, on the other hand, differentiates between blue and green with different characters.

Other properties within an image also exists other than color, and natural language terms exist for these properties. Examples are image sharpness, contrast, or blurriness, and these can also conceivably be modified.

The need arises, therefore, for a natural language user interface (LUI) within color image editing applications that can provide a simple, intuitive, and easy to use means for ordinary users to create desired changes in color images. While the color science and the underlying terminology is understood by color specialists and application developers, it is a significant challenge to build an intuitive human-computer interface for a casual user to easily create, select and modify image data.

Furthermore, mobile devices such as smart-phones are increasingly including the ability to capture, manipulate, and display color images. Users of these devices are typically not color specialists. In addition, the small form factor of the mobile device necessitates a very simple and intuitive interface for modifying colors in images.

INCORPORATION BY REFERENCE

The following references, the disclosures of which are incorporated in their entireties by reference, are mentioned:

U.S. Pub. No. 2008/0007749, published Jan. 10, 2008, entitled NATURAL LANGUAGE COLOR COMMUNICATION AND SYSTEM INTERFACE, by Geoffrey J. Woolfe, discloses a natural language control system with a dictionary of color terms from pre-existing dictionaries for adjusting colors in images.

U.S. Pub. No. 2009/0290794, published Nov. 26, 2009, entitled IMAGE VISUALIZATION THROUGH CONTENT-BASED INSETS, by Luca Marchesotti, discloses a method and system for forming an inset image, including identifying a region of interest in an original image.

BRIEF DESCRIPTION

Methods and apparatus of the present disclosure provide exemplary embodiment for a user interface system that modifies colors in a digital image using a natural language control system executed via a processor with a memory storing executable instructions having the method. The modifications are presented in real time in the system as modifications are made. The image is presented in a view of the interface and presents image modifications as they are made by the user in a text-based interface.

In one embodiment, a method for a user interface system is provided for modifying colors in a digital color image using a natural language control system. The method comprises displaying in a view of a display a textual interface configured to receive a color selection by the user and a direction of change for the color modification of the color selection. A swipe interface configured to receive a magnitude and/or a polarity of the color modification in the digital color image is provided. The received color selection and modification is applied to the digital color image. Those portions of the digital color image comprising the color selection are modified and the color modification is presented in real time to the user in the digital color image in the view of the display.

In another embodiment, a user interface system and natural language control system for a color modification of a color in a digital color image is provided. A user display comprises a view area having the digital color image displayed therein for the color modification of the color selected by a user and configured to present the color modification in real time to the user in the digital color image within the view of the display at portions of the digital color image having the color. A textual interface comprises modification controls for the color modification of the digital color image, and a swipe interface comprises receptor controls configured to receive a magnitude and/or a polarity selected for the color modification by the user. The swipe interface is configured to receive the magnitude and polarity based on an amount of a swipe motion sensed on the display by the user.

DETAILED DESCRIPTION

Aspects of the exemplary embodiment relate to a system and method for providing the ability to modify a digital color image using natural language commands through a simple and intuitive user interface. Natural language commands are particularly friendly for user interaction because the user identifies with the particular description in a familiar language. Of specific interest is the ability to offer a natural-language based interface that is suited for devices with limited form factors, such as smart-phones and other mobile devices.

A natural language color editing command has three components: i) the color or colors selected for modification, ii) the direction of modification, and iii) the magnitude and polarity of the modification. For example, the command: "make greens a lot more blue" specifies the selected colors ("greens"), the direction ("blue"), and the magnitude ("a lot more"). In the proposed embodiments, the three components are specified via a combination of textual and swipe-based user interfaces on the device.

In one embodiment a user selects a color for a digital color image modification to be implemented within the digital color image displayed on a viewing device, such as a mobile phone, or other display device. The colors are presented, for example, within an intuitive text-based interface, such as a digital spin box or slot machine interface. The color selections can comprise a textual description of the name of a particular color to be adjusted, such as "red", "dark blue", "skintone", etc. Alternatively, the color selections may be presented in the form of patches or swatches of colors. A combination of textual and swatch-based representations can also be presented. The swatch representation provides the advantage of eliminating some of the ambiguity that comes with natural language descriptions of color names. Elaborating via an example, the color "purple" may be selected for modification via the textual or swatch interface. The term "purple" actually encompasses a range of colors that form a connected region in color space. This region comprises purples of various degrees of properties such as brightness, hue, saturation, glossiness, etc. A single selection of a color for modification therefore in fact affects a connected region of colors in color space. Alternatively the color may be directly selected from the image. In this case the color could be associated with a color name and thus a connected region in color space.

A second text-based interface, such as another spin box, for example, is used for choosing a resultant direction of change for the color modification within the image. An example of a direction could be towards a particular color (e.g. blue or green) or along a dimension described by a particular color property (lighter/darker, more/less saturated, etc.).

Finally the magnitude and polarity of the color modification need to be specified. The magnitude of modification designates the amount by which the selected color is modified along the chosen direction within the digital color image. As such the magnitude indicates the final color difference between the original and modified image with respect to the selected color. For example, phrases or words, such as "slightly", "considerably", and "significantly" designate the amount by which the image modification is implemented. Likewise, the polarity of the color modification determines whether or not the modification is in the positive or negative sense along the selected direction, and is specified in natural language by the terms "less" or "more".

As mentioned earlier, in one embodiment, a swipe interface, rather than a text-based interface, is used to determine the magnitude and polarity of a color modification. A swipe interface such as a slider or dragging motion, for example, interfaces with a user by means of touch. For example, if the user selects a shade of green with a first text-based interface, and selects the direction "blue" with a second text-based interface (which is to be interpreted as "in the direction towards blue") and then swipes the digital color image with a motioned touch, the extent of the swipe will be translated to the magnitude with which the green colors in the image are shifted towards blue. For example, a small swipe would be translated to "slightly", while a large swipe will be translated to "considerably". The direction of the swipe can be used to indicate the polarity, wherein for example, a swipe from left to right within the image moves greens towards blue; while conversely a swipe from right to left in the image moves greens away from blue. The swipe interface therefore specifies the third component of a natural language command; namely the magnitude and polarity. The disclosure, however, is not limited to any specific phrase or words, in any particular language, and/or does not preclude mathematical phrases or symbols, or other designations for a language, and/or color samples and symbols.

Figure 1:
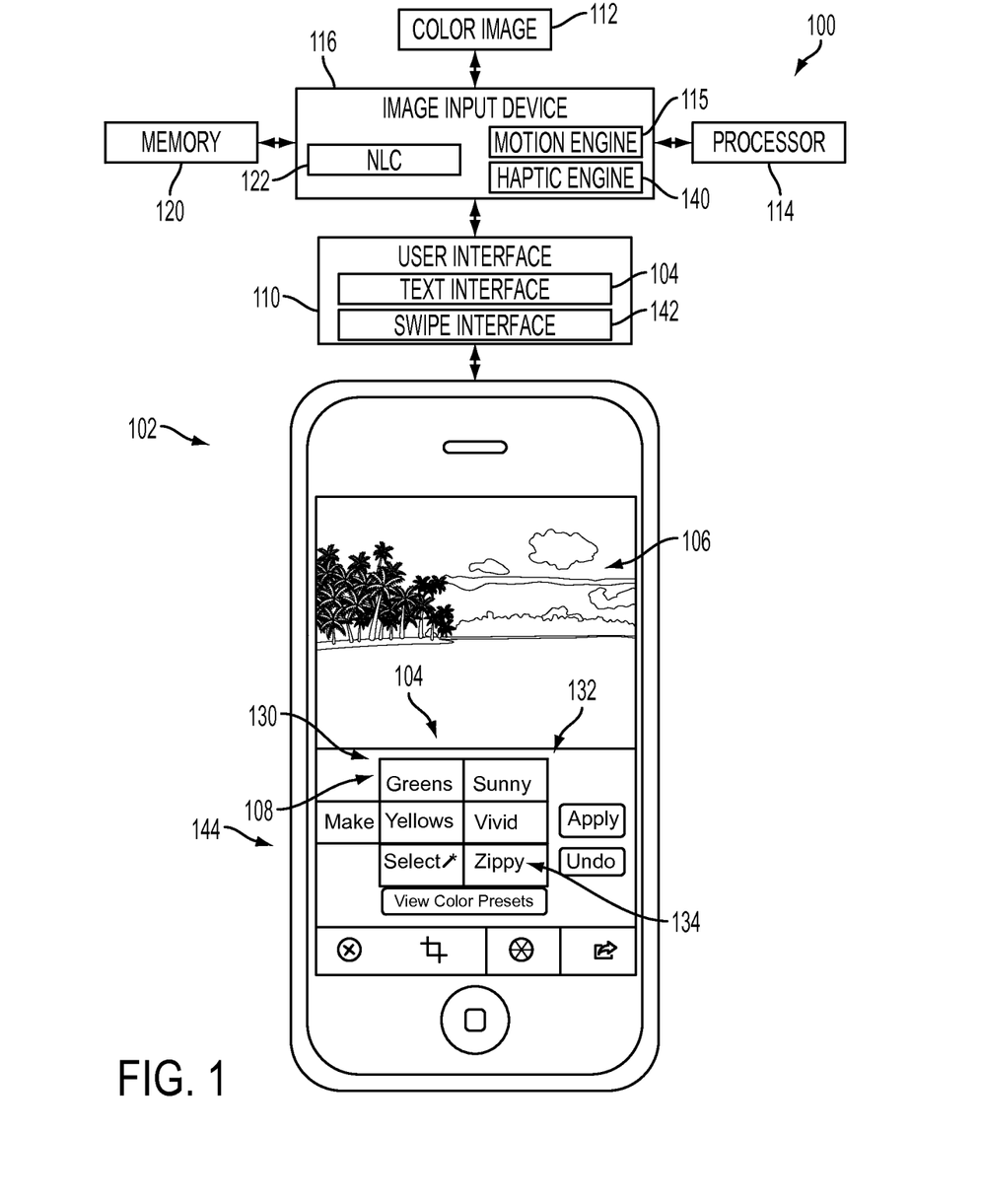
FIG. 1 is a functional block diagram of a user interface system comprising a natural language color control system and a user interface according to embodiments herein.

FIG. 1 illustrates one embodiment of an exemplary user interface system 100 for editing color in a digital color image. The system 100 comprises a processor 114 coupled to an image input device 116. The device comprises any device capable of executing a set of logical instructions and can comprise, for example, a computer, a personal digital assistant (PDA), digital camera, cell phone, printer, copier, or the like. Such devices can include the user interface 100, which may further comprise, but is not limited to, a key board, camera, microphone, pointing device, display, speakers, audio/visual inputs/outputs network connections and/or other devices of the device 116 and/or processor 114.

The image input device 116 is configured to receive a color image 112 for a color modification to be made by a user through the interface 100. The image input device 116 comprises a memory 120 for storing the document 114. A natural language control (NLC) system 122 executed via the processor 114 of the device 116, which can map the colors and/or features of the color image 112 to a working color space in order for modifications entered by the user to be affected therein. The NLC 118 will be discussed in further detail infra.

A digital color image 112 can be provided by a user, and can be for example a photo image, a text based document, or any document that may be printed, modified, and/or transferred in digital format and comprising color, for example. A digital image may be any digital representation of a body of information capable of being communicated to an output device for display, print, and/or alteration (e.g., a photo, or presentation document).

A user display 110 is coupled to the image input device and may be any display or multiple displays for viewing a graphical user interface or the user interface system 100 as an LUI.

In general, each image is stored within the memory 120. The image may be a thumbnail image comprising image data derived from the respective digital color image 112. Usually, a thumbnail image contains less information than the original, but not always. For example, each thumbnail image may be a reduced resolution and/or cropped, digital image generated from the original document or processed original document. All of the thumbnails in the set may be the same size. In some embodiments, the image may be otherwise digitally modified in creating the thumbnail, for example by conversion from color to monochrome (e.g., a black and white thumbnail). In other embodiments, a representative portion of the image is automatically selected as the thumbnail, avoiding the need for reducing resolution or resizing. Indeed, the thumbnail can be any visual representation of the digital color image which allows documents to be distinguished from each other in the set. In one embodiment, the thumbnail is a context-dependent image, as described, for example, in above-mentioned application Ser. No. 12/049,520 incorporated herein by reference. In such an approach, the portion of the image selected as the thumbnail may be dependent on the context in which the image is to be used. For example, if the user is known to be interested primarily in faces, a region of the image can be identified with suitable face recognition software and used as a basis for determining a suitable crop area.

The user display 110 comprises a view 102 that displays an image 106 of the system 100, which is a colored image. A text-based interface 104 is presented with selections 108 therein. The text-based interface 104 comprises two sections for display various types of selections 108. A first section 130 is for designating a color within the image 106 to be modified, and a second section 132 is for designating a direction of change for the modification. For example, "yellows" might be selected in the first section 130 for all yellows in the image 106 to be modified. Other selections, as discussed above, may comprise other color groups, and/or specific colors with text-based descriptions and/or a visual swatch representation. Likewise, the direction of the modification for "yellows" may be towards making the "yellows" "vivid," for example, as selected in the second section 132 of the text-based interface 104. The selections of the second section 132 are not limited to any one color, or group of colors, but may also be a texture change, appearance change in the color selected, or any other type of modification operable to move the selected color from the first set of selections 108 in the first section 130 towards a certain direction, such as making yellow more/less vivid, for example.

In one embodiment, the first section 130 and second 132 of the textual interface 104 comprise slot machine boxes respectively for a slot-machine interface. For example, the textual interface comprises a slot-machine interface with digital spin boxes that rotate among different slots 134 having the various selections 108 respectively. The rotation could be effected by finger touch and movement of the spin-boxes 130 or 132 shown on the display 110. This is accomplished via a haptic engine 140 driving the textual interface 142 to be implemented in the user display 110. Alternatively the rotation could be accomplished by shaking or moving the device, in which case the text-based interface would present a different portion of the spin box at different times depending on the motion of the device 116. For example, the device 116 has a motion engine 115 that may be a sensor or motion detection device. If the device 116 is a mobile phone, then once the phone is shook the motion engine 115 triggers the slot machine interface slots 134 to rotate around to display other selections 108.

As mentioned previously, interface system 100 comprises an underlying haptic engine 140. In addition to driving the textual interface for rotating the spin-boxes, the haptic engine is also used to drive a swipe interface 142 to be implemented in the user display 110. The view has the swipe interface 142 therein that is operable upon a swipe motion across the view 102 to implement a magnitude and/or polarity of the color modification to be displayed in the image 106. The component of the natural language command 144 that indicates how much and in what sense are therefore supplied by the swipe interface 142 via a motion swipe across the view 102. The result being "make yellows vivid" for example, with the "a lot more," "a little less" or some other wording for magnitude/polarity being generated by the swipe interface 142 depending on the swipe motion. For example, a long swipe could designate "a lot," while a swipe to the right might designate "more," rather than "less." The disclosure is not limited to any particular configuration and the examples herein are meant for purposes of explanation. Any configuration of the swipe interface as appreciated by one of ordinary skill in the art is envisioned. For example a slider could be moved instead of swiping directly on the image.

In one embodiment, the view with the digital image 106 is presented concurrently alongside the text-based interface 104. This enables color modifications to be displayed in real time to the viewer as selections 108 for the modifications are made or chosen and the swipe interface 142 to be triggered concurrently. Another advantage, is that all the selections for the color modification comprising a color choice, a direction for the color to be modified toward (e.g., a resultant color or change), and magnitude/polarity are all displayed in real time, at the same view and displayed concurrently to the user/viewer.

Figure 2:
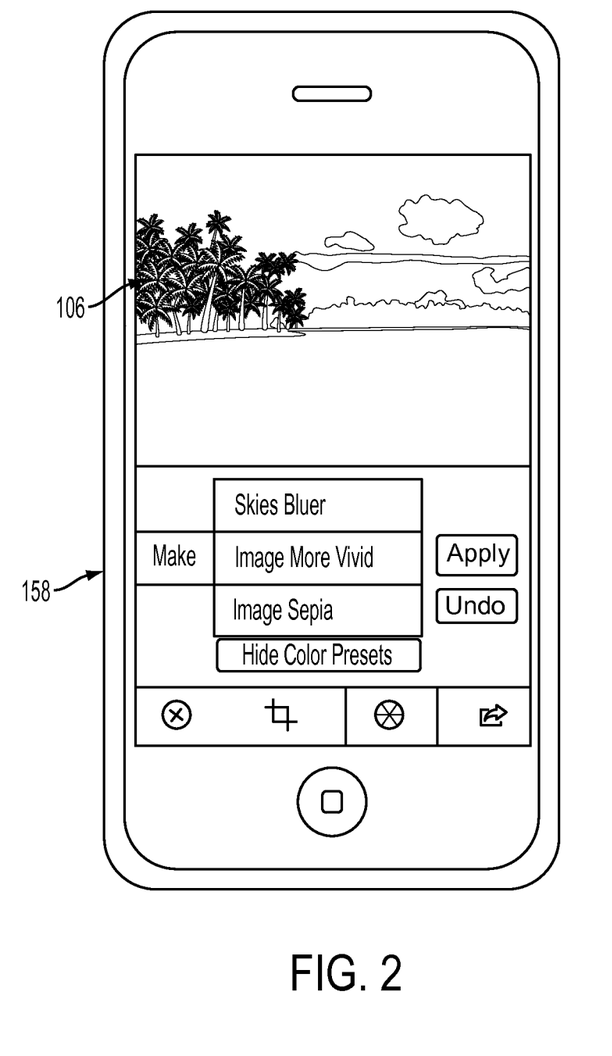
FIG. 2 is a schematic representation of a user interface screen according to embodiments herein.

FIG. 2 illustrates an exemplary embodiment of the user interface system. Upon selection of the preset option, the first section 130 and second section 132 of the text-based interface 104 are combined to form a single spin box or other text-based interface having predefined commands or sentences 158 for a color modification. For example, "image more vivid" may be provided for creating a more vivid or brighter image 106. The skies can be made bluer in varying degrees. Other examples may include "faces warmer," "image sunnier," and/or "grass greener." The objects can thus be predefined with the color modification to be made in conjunction thereat.

Figure 3:
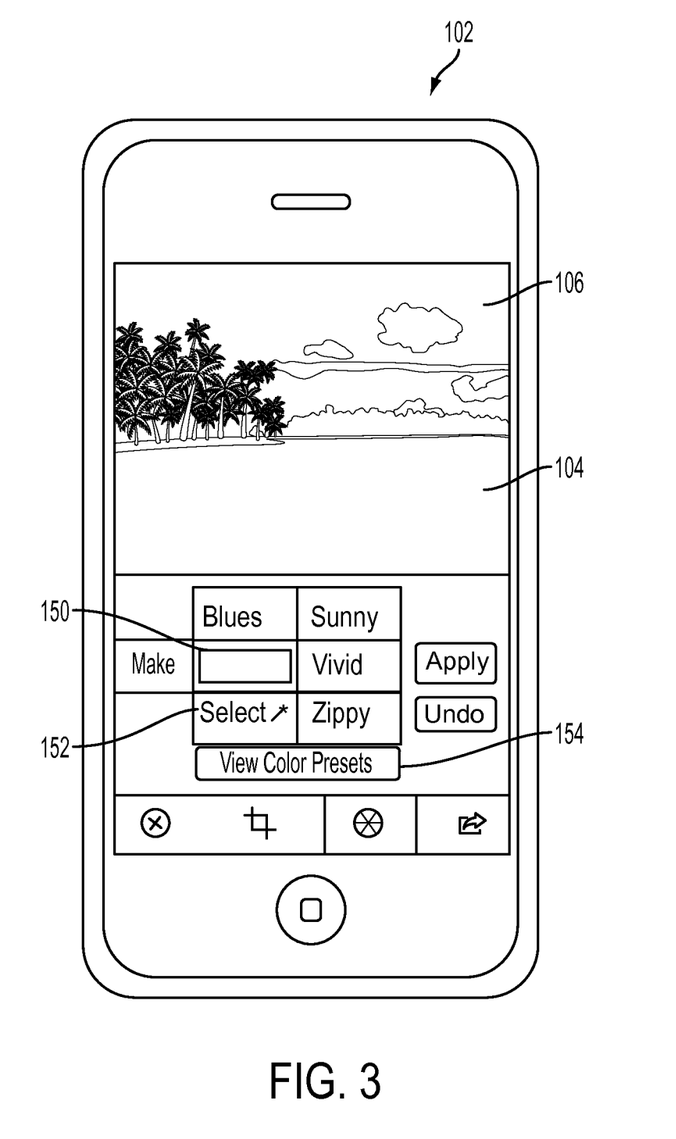
FIG. 3 is a schematic representation of a user interface screen according to embodiments herein.

FIG. 3 illustrates the view 102 of the user interface system 100 wherein the spin box of the first section 108 of the text based interface 104 comprises a sample color selection 150. The spin box 108 further comprises a particular selection 152 in the slots of the spin box that enables a user to select the color for a color modification directly from a point in the digital color image 106. For example, if the color of the sky is touched the color is presented in the selection from the user display 110. Various colors within the image 106 can be selected and modified in this manner for choosing the modified color. Once the particular selection 152 marked as "select" in FIG. 2 is selected, the device maps this selection to a region in color space to be affected. Smart region growing techniques, which are known in the art and not explained in detail here, can be used to determine the region(s) of color space to be affected.

In addition, other colors may be selected and modified for the direction in which the modification is to be implemented. The modifications are displayed in real time upon being applied and/or undone as well depending on the user's desire. Further, modification can be cumulated upon one another in sequence. For example, a blue color could be made more green, and thereafter, greens all made lighter in a subsequent modification.

The interface further comprises a preset option 154. Upon selection of the preset options various predefined or preset color adjustment options are presented.

The presently disclosed user interface comprising the textual and swipe interfaces is built upon an underlying natural language color control system for deriving and applying a color transform to the image. Described herein are the details of the natural language color control system, which has been disclosed in U.S. patent application Ser. No. 11/479,484 and U.S. patent application Ser. No. 11/479,484. These are incorporated herein by reference in their entirety, and portions have been reproduced below to provide detailed support in the present disclosure.

Figure 4:
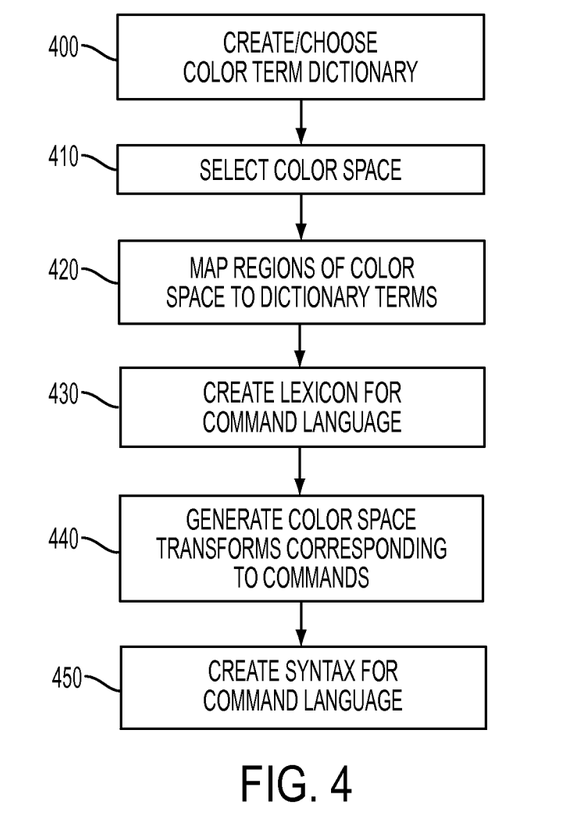
FIG. 4 is a flowchart detailing an exemplary method for correlating a working color space with a natural language dictionary of color terms.

The natural language color control system could be created as described in the flowchart of FIG. 4. The acts are listed in a particular order in the flowchart. However, this order should not be considered limiting, as the order of many of these acts may be changed without affecting the resulting color control system. First, a natural language color description dictionary of terms would be created and/or chosen from a set of pre-existing dictionaries 400. Then a color space in which the transformations will be performed is chosen 410. The regions of the color space are then mapped to terms in the color dictionary 420. A dictionary of command terms also needs to be created or selected 430. In embodiments, a library of basic transforms in the color space corresponding to various command terms would also be generated 440. There would be a general mapping between particular transform forms and command forms. The details of a user command would be used to tailor a transform once it was selected from the library as described in more detail with respect to FIG. 6. In addition to generating a lexicon of command terms, a syntax for using the command terms from the command dictionary in combination with the color terms of the color dictionary would be chosen as well 150. Both of the command and color term dictionaries may simply be part of one big dictionary.

Figure 5:
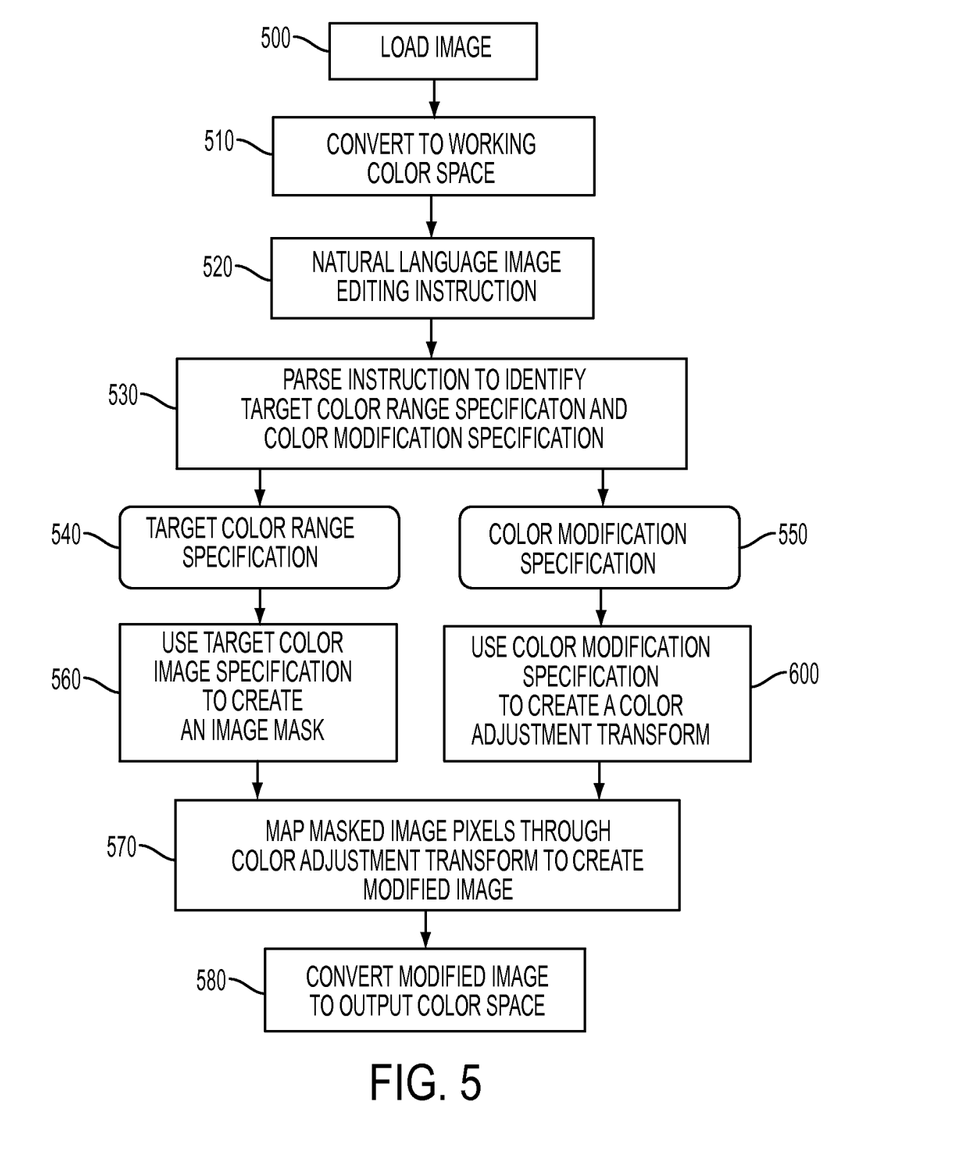
FIG. 5 is a flowchart detailing an exemplary embodiment of a natural language color modification method.

FIG. 5 illustrates an embodiment of a natural language color control and calibration system that provides the framework and basis for the proposed user interface for adjusting the colors of an image or portion thereof. Again, the acts are listed in a particular order in the flowchart. However, this order should not be considered limiting, as the order of many of these acts may be changed without affecting the resulting color control system.

At 500, the user would select a subject. The subject may be, for example, a scanned or created image or a set of input colors of a multi-dimensional lookup table. The subject may also be a portion of an image. For example, the user may be able to identify a quadrant of an image or a particular object in an image that the user would want to adjust. The natural language system included herein also encompasses the ability to mark areas of an image to be adjusted using a point and click system. At 610, some or all of the selected subject would be mapped from the initial color space into the working color space of the color control system before or after the command is entered. The initial color space may be, for example, RGB on a display screen or CMYK on a printed document. For an image, for example, this may be a pixel-by-pixel mapping. However, many programs exist to reduce the time and processing power of such a mapping. For example, various algorithms use sampling techniques and/or allow a system to recognize uniform patches. The working color space could be any color encoding in which the color adjustment algorithms referenced in 530 are conveniently applied. In general, perceptually uniform, device independent color encodings are preferred as working spaces.

The user also issues a verbal or written instruction to indicate the change required for one or more selected colors in the image at 520. This command may be entered before or after the image or portion of the image is mapped into the working color space. The language used for this instruction could be the natural language of the user or it might be a language defined or limited by the application; e.g., the application may provide a user interface that could limit the language to a defined vocabulary or facilitate the parsing operation.

At 530, the program would translate the entered verbal or written instruction into a color transform in the color working space. The program would contain a set of rules or instructions for parsing the instruction and implementing a transformation to the image corresponding to the user's command. The natural language command may be parsed to separate the command into components such as, for example, a target or resultant color range specification 540, and a color modification specification 550.

The target color range specification would include the selection of color or colors to be modified. The selection may be specified in natural language terms using color names such as "blue", "light green", "dark brown", etc. Alternatively, the selection may be specified by directly pointing to a color in the image with known numerical values (for example, RGB values). In this case, the numerical values can be used directly to derive the color transform; or could be translated to natural language terms to enable an intuitive user interaction. The target color range specification may also specifically identify colors that are not to be modified. The image adjustment would then be applied only to those colors that are included in the color range specified to be adjusted. In 560, an image mask would be created from the specified color range 540 and the image in the working color space. The image adjustment will therefore be applied only to those colors that are included in the mask. In embodiments, a particular color might be present in an area of overlapping regions of specified color ranges and therefore might be contained within two or more overlapping ranges. If the user were to enter verbal commands involving both these regions then the program make an internal logic decision based upon a set of preprogrammed rules. For example, the commands may be followed consecutively with the last command entered given priority over earlier commands.

There are many methods, familiar to those of ordinary skill in the art, by which a mask can be created. One such method involves representing the specified color range as a subvolume of the working color space and then determining, for each pixel in the mapped image, if the color of the pixel is inside the specified color range subvolume. All such pixels inside the specified color range subvolume are in the mask while all pixels outside the specified color range subvolume are excluded from the mask. Another method of creating the image mask is to associate with each color in the color name dictionary or dictionaries one or more prototypical locations (points rather than subvolumes) in the working color space. For each image pixel the nearest prototypical color name location is determined and those pixels with nearest prototypical locations associated with color names in the specified color range are included in the mask. Pixels with a nearest prototypical location associated with color names not in the specified color range are excluded from the mask. While it is possible to map each individual pixel, algorithms exist to simplify such mappings. For example, various algorithms use sampling techniques and/or allow a system to recognize uniform patches.

Yet another alternative method to construct the mask is to construct a multidimensional lookup table, the input values of which sample the working color space. When the image pixel colors are mapped through this multi-dimensional lookup table the output values indicate whether the pixel are included in the mask or excluded from the mask. Such an embodiment might result in output values between 0 and 1 where a value of 0 represents exclusion from the mask and a value of 1 represents inclusion in the mask. Since multi-dimensional lookup tables generally use interpolation to determine output values the possibility of values between 0 and 1 exists. In such cases these fractional values could be retained, resulting in a fuzzy or blurred mask. In such a fuzzy or blurred mask pixels returning values between 0 and 1 would be considered to be partially included in the mask. Pixels that are partially in the mask would undergo a partial image adjustment. Alternatively, the output values might be rounded, or otherwise adjusted, to give only values of 0 or 1, thereby generating a binary mask.

Other methods for mapping such input terms into the working color space include, for example, use of Voronoi partitions, other tessellation methods, and k-D trees. A general example of such a method, suitable for both convex and non-convex regions, comprises tessellating each named region in the color space with tetrahedral simplices. Testing whether a given color lies inside any of the tetrahedra comprising the region will determine whether the color lies within the region. In the case of convex regions of the color space simpler tests not requiring tessellation of the region can be used.

In 600, the natural language instruction is used to create a color adjustment transform. There are numerous methods by which such transforms could be constructed but in general all such methods will include the act of parsing the verbal color modification specification to determine 1) the magnitude of the desired modification, 2) the property that is to be modified and 3) the direction in which it is to be modified. These three pieces of information are a minimum requirement for any color adjustment transform. Additional information might be required to more fully specify the required transform before it can be constructed.

Figure 6:
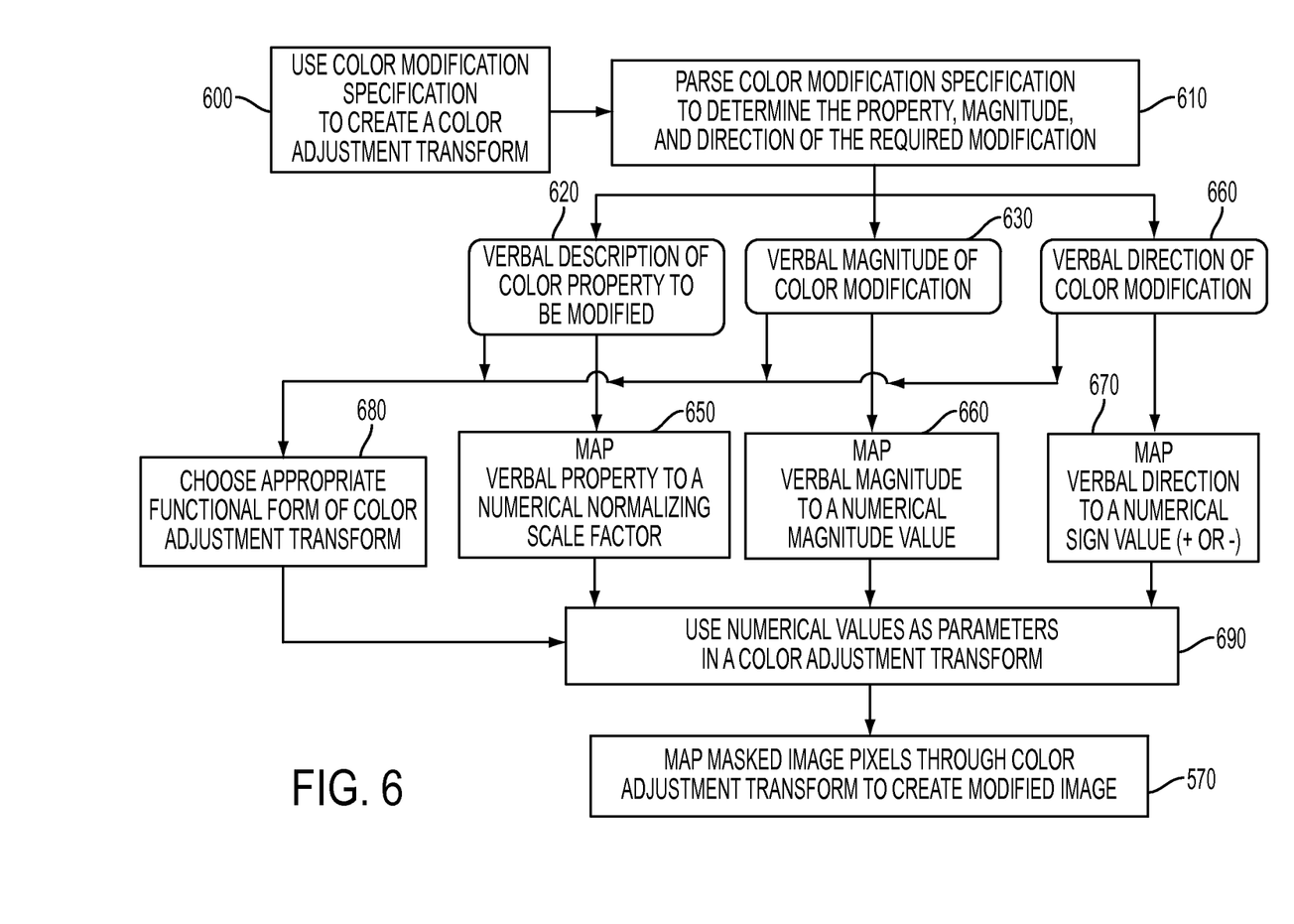
FIG. 6 is a flowchart detailing a general process for implementing a natural language command in a working color space.

Such additional information might be acquired from the pixels that are included in the mask. Such pixel-related information might include color values and spatial locations. The values of individual pixels or population statistics might be used in transform construction. What follows is a general example of transform construction, using an example command or instruction language such as, for example, those discussed herein. The acts involved in this general example of transform construction are illustrated in FIG. 6.

First, a verbal color modification specification is parsed 610 to obtain verbal specifications for the color property to be modified 620, the magnitude of the color modification 630, and the direction of the color modification 640.

The command, "Make the red colors slightly less saturated" is first parsed into a target color range specification 540 (the red colors), and a color modification specification 550 (slightly less saturated), as noted earlier. Then, at act 600, the color modification specification is parsed into the color property to be modified 620 (saturation), the magnitude of the color modification 630 (slightly), and the direction of the color modification 640 (less). The verbal description of the color property to be modified is mapped to a numerical normalizing scale factor in step 650. This act allows for the magnitude specifications to be normalized such that the verbal descriptions of magnitude (630) correspond to equivalent or very similar perceptual changes in the target color regardless of the property that is being modified and regardless of the color being modified. For this example, the magnitude of color change requested is "slight" and this should lead to a perceptually similar "slight" change in the target "red" colors regardless of what perceptual property we are changing.

Perceptual properties can include, for example, saturation, lightness, darkness, colorfulness, chroma, hue, contrast, redness, greenness, yellowness, blueness, orange-ness, pinkness, brown-ness, purple-ness, and grayness. Additionally, one could modify any property that could be described as (color-name)-ness by moving the selected colors in a direction toward the prototypical location of (color-name). e.g., to increase the mauve-ness of a selection of colors move them toward the prototypical location of color name 'mauve'.

At 660, the verbal magnitude of the color modification is mapped onto a numerical magnitude value. Generally, and in the interests of common sense, words that signify a larger magnitude would be mapped onto larger numerical magnitude values, but this is not a requirement. It is desirable however that the numerical magnitude scale, onto which magnitude words are mapped, corresponds linearly to the perceived magnitude that an average population, with normal color vision, associates with the verbal magnitude word or phrase.

Perceptual changes in a property will likely depend in part upon the color being modified and upon its initial scaled value in that property. For example, what constitutes a slight lessening of the saturation of reds in an image would likely be different if there was a low saturation of red in the image, then if there was a high saturation of red. In embodiments, the magnitude of a "slight" property change in the working color space would depend upon the context in which it was used.

Act 670 involves mapping the verbal direction to a numerical sign value (+ or −). This can be simply implemented by mapping the verbal direction to a multiplicative factor of +1 for verbal indications that increase a property and −1 for verbal indications that decrease a property.

The numerical values determined in 650, 660 and 670 are used as parameters in a color adjustment transform. This occurs in 690. Generally a color adjustment transform will have some pre-determined functional form and the numerical values are applied to this functional form to control its specific effect on the colors. The choice of functional form of the color adjustment transform would be made in 680. The choice might be arbitrarily made by the application designer or the functional form might be algorithmically determined by, for example, the values of the color property to be modified, the verbal magnitude of the color modification and the verbal direction of the color modification. The program implementing converting the natural language command into a transform in the color working space may have a library of basic forms to map to different sets of user instructions. Based upon the natural language command entered by the user, the program selects a functional form from this library. For example, one functional form might be chosen for lightness modifications and a different form chosen for chroma modifications. In this case, the functional form to which the numerical values determined in boxes 650, 660 and 670 are applied, would depend on the type of color property to be modified.

As a trivial example of applying the numerical values to a functional form, consider the simple functional form of a linear mapping. Such a mapping will have two parameters—the slope of the line and an intercept. In this trivial example, the linear function would map the original value of the specified color property to a modified output value of that property. The slope of the line could be determined from the product of the values of the numerical normalizing scale factor, the numerical magnitude value and the numerical sign value. The intercept value of such a linear mapping would generally be zero, but might also be derived from the numerical magnitude value in special cases.

More complex functional forms will generally require more parameters to define them. The numerical values determined in 650, 660 and 670 would therefore be used to determine the values of the parameters. The numerical values may simply be assigned to the parameters, or parameters may be determined by some mathematical modification of combination of the numerical values.

Returning to FIG. 5, in 570, a modified color image is created by applying the color modification transform and the image mask created in 680 and 560 respectively to the original image. Finally, the modified color image is then converted back to the original color space in 580 and displayed to the user.

Figure 7:
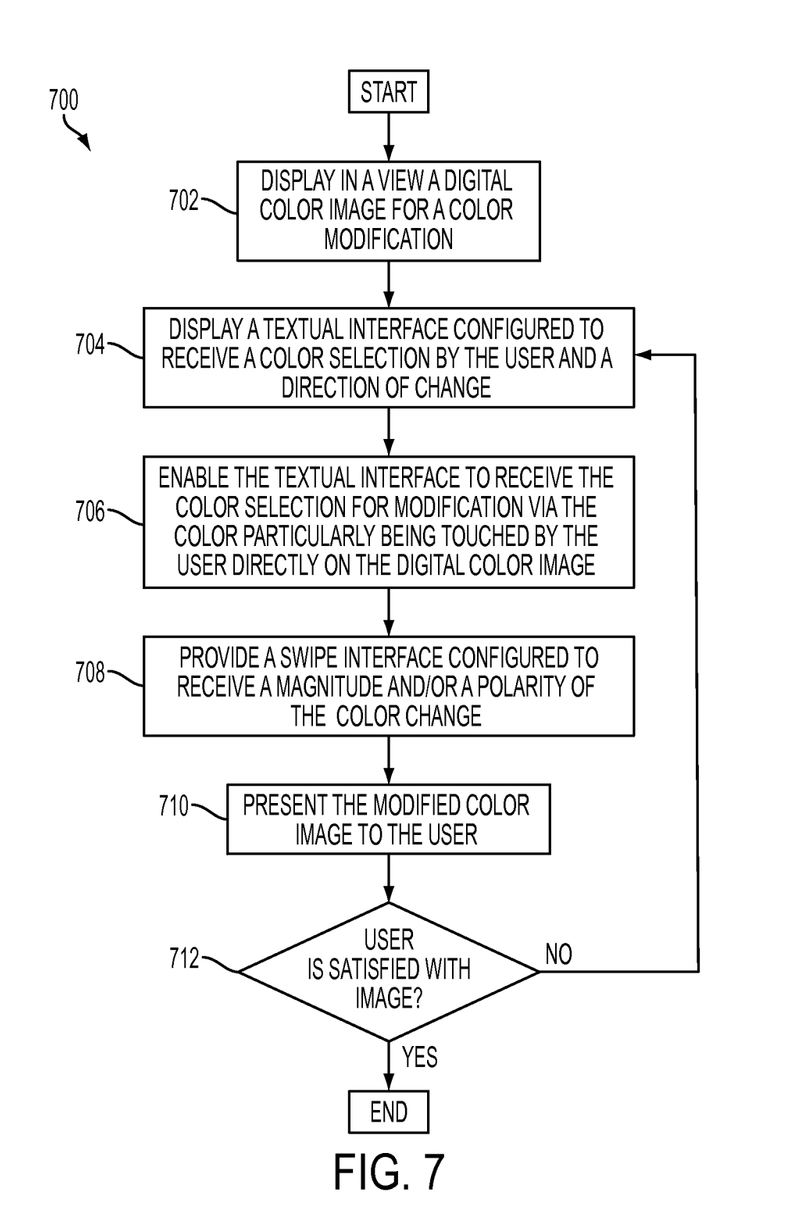
FIG. 7 is a flowchart detailing a method for a user interface system that generates image modifications within an image.

An example methodology 700 for implementing a user interface system for modifying colors of a document is illustrated in FIG. 7. While the method 700 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At 702 a digital color image is displayed within a user display for a color modification to be implemented therein. The user interface system is configured to display color modifications in real time as they are made by a user.

At 704 a textual interface is displayed in the view to receive a color selection by the user and a direction of change for the color selected in the modification. The textual interface or text-based interface is configured to provide color selections and directions of change (e.g., a resultant color) via a selection of a slot-machine interface displayed. The selections may be presented as the name of a color, for example. The slot-machine interface therein displays a first and a second digital spin box configured respectively to rotate among different slots that have different selections therein. Each selection corresponds to a color to be modified and/or directions of change for the modification. In one embodiment, the textual interface receives a request for viewing different preset color adjustment options representing predefined language commands. The spin boxes are combined and rotatable through different present color adjustment options.

At 706 the interface is enabled to receive a color selection for the modification by the color particularly being touched by the user directly on the digital color image.

At 708 a swipe interface is provided that is configured to receive a magnitude and/or a polarity of the modification. A swipe motion across the view with for example a finger or pen or other pointing device enables inputs to be received for the degree of magnitude and if the magnitude is in a decreasing or increasing direction, for example.

At 710 the color modification is presented in real time to the user in digital color in the image.

At 712 a decision is made whether the user is satisfied, and if the user is not satisfied with the image the method repeats, for example, at 704 where a color selection and a direction change is received. If the user is satisfied with the modified image, the method ends.

The method illustrated in FIG. 7 may be implemented in a computer program product that may be executed on a computer or on a mobile phone in particular. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 7, can be used to implement the method for editing images in a document.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for a user interface system for modifying colors in a digital color image using a natural language control system executed via a processor with a memory storing executable instructions having the method, comprising:

displaying in a view of a user display the digital color image for a color modification to be displayed in real time by a user;

displaying in the view of the display a textual interface configured to receive a color selection by the user for modification, and a direction of change for the color modification of the color selection;

providing a swipe interface configured to receive a magnitude and/or a polarity of the color modification in the digital color image;

providing a preset option for viewing different color adjustment options representing predefined language commands;

in response to receiving a selection of the preset option, combining the textual interface and the swipe interface into a single digital spin box configured to rotate through different preset color adjustment options;

displaying in the view of the display the slot machine interface to the user;

applying each received color, modification, and preset color adjustment selection to the digital color image, wherein those portions of the digital color image comprising the color selection are modified; and presenting the modified color image to the user in the view of the display.

2. The method of claim 1, further comprising:

receiving the color selection and the direction of change for the color to be modified via a selection of a slot-machine interface displayed to the user;

wherein the slot-machine interface displays at least one digital spin box configured to rotate among different slots having different selections displayed therein respective for the color selections and/or directions of change, and configured to display a portion of the spin box comprising a portion of the different slots with the selections;

wherein the digital spin box is rotated to display a different portion of the different slots in the digital spin box at different times via motion of the device, a click on the display and/or a touch swipe to the digital surface of the digital spin box.

3. The method of claim 2, wherein different selections for the color to be modified are presented within a first digital spin box while different selections for the direction of the color to be modified are presented within a second digital spin box of the slot-machine interface and the selections comprise text-based color descriptions, wherein the selections of color are presented as color names.

4. The method of claim 1, wherein the digital color image and the textual interface are displayed to the user concurrently, and the view with the image provides the swipe interface that receives the magnitude and polarity of the color modification specified by the textual interface.

5. The method of claim 3, comprising:

upon selecting the colors to be modified within a first digital spin box of the slot-machine interface, enabling the interface to receive the color selection for modification via the color particularly being touched by the user directly on the digital color image.

6. The method of claim 1, wherein the view of the user display is provided within a mobile device to display the digital color image for the color modification therein.

7. The method of claim 1, wherein the swipe interface operatively receives the magnitude of the modification via a touch swipe across the image.

8. The method of claim 1, wherein the color modification presented in real time is presented within a portion of the image that is displayed in the view of the display, the portion comprising the color selected for the modification.

9. The method of claim 1, wherein applying the received color selection and modification to the digital color image further comprises:

mapping the digital color image into a working color space;

receiving via the combination of textual and swipe interfaces a natural language command from a user to modify the color in at least a portion of the image selected by the user, wherein the natural language command specifies the color selected for color modification in the image, and the modification associated therewith in natural language;

parsing the natural language command into a description of a color property to be modified, the magnitude of the modification, and the direction of the modification;

converting the parsed natural language command into a mathematical transform in the working color space; and applying the mathematical transform to the digital color image to adjust the one or more selected colors.

10. A method for a user interface system in a mobile device for modifying colors in a digital color image captured using a natural language control system executed via a processor with a memory storing executable instructions having the method, comprising:

displaying in a view of a user display the digital color image captured for a color modification by a user;

displaying in the view of the display a textual interface configured to receive a color of the digital color image selected by the user and a direction of change for the color modification of the color selected;

providing a swipe interface in the view that operatively receives a magnitude and/or a polarity of the modification via a touch swipe across the image for the color selected in the digital color image;

applying the received color selection and modification to the digital color image, wherein those portions of the digital color image comprising the color selection are modified; and presenting the modified color image to the user in the view of the display.

11. The method of claim 10, further comprising:

receiving the color and the direction of change for the color to be modified via a selection in the slot-machine interface displayed to the user;

wherein the slot-machine interface displaying at least one digital spin box configured to rotate among different slots having different selections displayed therein respectively, and displaying a portion of the spin box comprising a portion of the different slots, wherein different selections for the description of the color property to be modified are presented within a first digital spin box while different selections for the direction of the color to be modified are presented within a second digital spin box of the slot-machine interface, wherein the selections of color within the first digital spin box are presented as color names.

12. The method of claim 10, receiving a command input for the color selected for the color modification, wherein the digital color image and the slot-machine interface are displayed to the user simultaneously, and the view with the digital color image provides the swipe interface for the color modification of the digital color image.

13. The method of claim 10, upon receiving a particular selection in the slots, the color selected by the user for the natural language command is determined by the user touching directly the display on the color in the digital color image.

14. A user interface and natural language control system for a color modification of a color in a digital color image comprising:
- a user display comprising a view area having the digital color image displayed therein for the color modification of the color selected by a user and configured to present the color modification in real time to the user in the digital color image within the view of the display at portions of the digital color image having the color;
- a textual interface comprising modification controls for the color modification of the digital color image, wherein the textual interface further comprises a preset mechanism configured to display slots having preset selections for receiving the color to be modified and a direction for the modification; and
- a swipe interface comprising receptor controls configured to receive a magnitude and/or a polarity selected for the color modification by the user;
- wherein the swipe interface is configured to receive the magnitude and polarity based on an amount of a swipe motion by the user that is sensed on the display.

15. The system of claim 14, wherein the modification controls comprise a first spin box having slots with text-based selections configured to select a color respectively for modification by the user in the image, and a second spin box having slots with text-based selections for selecting a direction of the color modification of the color selected by the user, and the slots comprise at least one text-based selection that configures the interface to receive a particular color for color modification via a touch selection by the user directly on the display at the particular color in the digital color image.

16. The system of claim 14, wherein the digital color image and a slot-machine interface are displayed to the user simultaneously, and wherein the user display is contained in a mobile device and the digital color image is a photo image displayed therein.

17. The system of claim 14, wherein the natural language control system comprises:
- a dictionary of ordinary language color terms corresponding to the selections of the slots, wherein every portion of a working color space is mapped to at least one term in the color term dictionary;
- an ordinary language command lexicon and syntax for use with the ordinary language color terms that correspond to transformations in the working color space; and
- a processor configured to parse the ordinary language command related to the color in the digital color image selected for modification, to determine which portions of the digital color image to modify by consulting the dictionary of ordinary language terms in view of the parsed ordinary language command, and to determine how to adjust the digital color image based on the color to be modified by consulting the ordinary language lexicon and syntax.

18. The system of claim 14, comprising a motion sensor configured to sense a shaking motion, wherein the digital spin box is rotated to display a different portion of the different slots in the digital spin box at different times via the shaking motion sensed by the motion sensor, a click on the display and/or a touch swipe to the digital surface of the digital spin box.

* * * * *